(12) United States Patent
Jiang

(10) Patent No.: US 7,579,872 B2
(45) Date of Patent: Aug. 25, 2009

(54) LOW-VOLTAGE DIFFERENTIAL SIGNAL DRIVER FOR HIGH-SPEED DIGITAL TRANSMISSION

(75) Inventor: Jian Hong Jiang, Sunnyvale, CA (US)

(73) Assignee: Fujitsu Limited, Kanagawa (JP)

( * ) Notice: Subject to any disclaimer, the term of this patent is extended or adjusted under 35 U.S.C. 154(b) by 0 days.

(21) Appl. No.: 11/421,256

(22) Filed: May 31, 2006

(65) Prior Publication Data
US 2007/0279095 A1 Dec. 6, 2007

(51) Int. Cl.
H03K 19/0175 (2006.01)
H03K 19/094 (2006.01)
H03K 19/20 (2006.01)
H03K 19/086 (2006.01)
H03K 3/00 (2006.01)
H03B 1/00 (2006.01)

(52) U.S. Cl. .................. 326/83; 326/82; 326/115; 326/121; 326/127; 327/108

(58) Field of Classification Search ................ None
See application file for complete search history.

(56) References Cited

U.S. PATENT DOCUMENTS

| | | | | |
|---|---|---|---|---|
| 6,111,431 | A * | 8/2000 | Estrada | 326/83 |
| 6,262,606 | B1 | 7/2001 | Tamjidi | 327/108 |
| 6,313,662 | B1 | 11/2001 | Ide | 326/83 |
| 6,353,334 | B1 | 3/2002 | Schultz et al. | 326/82 |
| 6,603,348 | B1 * | 8/2003 | Preuss et al. | 327/563 |
| 6,992,508 | B2 | 1/2006 | Chow | 326/86 |
| 7,135,887 | B1 | 11/2006 | Shumarayev et al. | 326/38 |
| 7,301,371 | B2 | 11/2007 | Kim | 326/82 |
| 2001/0040466 | A1 | 11/2001 | Ide | 326/83 |
| 2003/0197534 | A1 * | 10/2003 | Feng | 327/141 |
| 2003/0210074 | A1 * | 11/2003 | Morgan et al. | 326/83 |
| 2004/0032282 | A1 * | 2/2004 | Lee et al. | 326/39 |
| 2005/0179466 | A1 | 8/2005 | Kasanyal et al. | 326/87 |
| 2005/0285629 | A1 * | 12/2005 | Hein et al. | 326/115 |
| 2006/0125533 | A1 * | 6/2006 | Kim et al. | 327/112 |

OTHER PUBLICATIONS

Ng et al., "Low Power Gbit/sec Low Voltage Differential Signaling I/O System," Electrical Engineering and Computer Science, University of California, Berkeley, 7 pages, http://www.ocf.berkeley.edu/~eng/classes/241Report.pdf, Jun. 29, 2006.

(Continued)

Primary Examiner—Vibol Tan
Assistant Examiner—Matthew C Tabler
(74) Attorney, Agent, or Firm—Baker Botts L.L.P.

(57) ABSTRACT

A low-voltage differential signal driver for high-speed digital transmission includes a first converter operable to receive a signal in a first type and convert the signal into a second type, wherein a resistance of the first converter is variable. A second converter couples to the first converter, the second converter is operable to receive a signal in the second type and convert the signal into the first type, wherein a resistance of the second converter is variable. The driver is operable to scale the resistance of the first and second converters to provide a constant ratio between the resistance of the first and second converters.

15 Claims, 3 Drawing Sheets

OTHER PUBLICATIONS

Patent Pending U.S. Appl. No. 11/421,239, entitled "Low-Voltage Differential Signal Driver for High-Speed Digital Transmission," by Jian Hong Jiang, 15 pages plus 2 drawing pages, filed May 31, 2006.

Patent Pending U.S. Appl. No. 11/421,522, entitled "Low-Voltage Differential Signal Driver for High-Speed Digital Transmission," by Jiang Hong Jiang et al., 16 pages plus 2 drawing pages, filed Jun. 1, 2006.

USPTO Office Action for U.S. Appl. No. 11/421,239, inventor Jian Hong Jiang, filed Aug. 23, 2007.

USPTO Office Action for U.S. Appl. No. 11/421,239, inventor Jian Hong Jiang, filed Jan. 30, 2008.

USPTO Office Action for U.S. Appl. No. 11/421,239, inventor Jian Hong Jiang, filed Aug. 18, 2008.

USPTO Office Action for U.S. Appl. No. 11/421,239, inventor Jian Hong Jiang, filed Dec. 24, 2008.

* cited by examiner

LOW-VOLTAGE DIFFERENTIAL SIGNAL DRIVER FOR HIGH-SPEED DIGITAL TRANSMISSION

TECHNICAL FIELD

This invention relates generally to signal communication, and more specifically, to a low-voltage differential signal (LVDS) driver for high-speed digital transmission.

BACKGROUND

Various Complementary Metal-Oxide Semiconductor (CMOS) driver architectures exist for high-speed digital transmission. The CMOS driver architectures encounter problems of low output voltage swing when the supply voltage approaches 1.2V. This problem arises because transistors in the signal path consume voltage headroom, which reduces the amplitude of the differential output voltage.

If the driver has an n-channel Metal-Oxide Semiconductor (NMOS) digital-to-analog converter (DAC) (NDAC), the common mode output level is controlled by a common mode feedback (CMFB) circuit and a p-channel Metal-Oxide Semiconductor (PMOS). Using a fixed PMOS, the ratio of the PMOS resistance to the NDAC resistance is not constant. The variation in voltage across the PMOS is large and not optimized, which reduces overall available output voltage.

SUMMARY OF THE DISCLOSURE

In accordance with the present invention, disadvantages and problems associated with previous techniques for increasing differential output voltage using an LVDS driver may be reduced or eliminated.

According to one embodiment of the present invention, a low-voltage differential signal driver for high-speed digital transmission includes a first converter operable to receive a signal in a first type and convert the signal into a second type, wherein a resistance of the first converter is variable. A second converter couples to the first converter, the second converter is operable to receive a signal in the second type and convert the signal into the first type, wherein a resistance of the second converter is variable. The driver is operable to scale the resistance of the first and second converters to provide a constant ratio between the resistance of the first and second converters.

Certain embodiments of the invention may provide one or more technical advantages. A technical advantage of one embodiment includes providing a variable feedback PMOS DAC (PDAC), which optimizes the differential output voltage of the LVDS driver. Accordingly, the voltage headroom increases and the voltage headroom consumed by transistors decreases. Therefore, there is more headroom for a signal before compression or distortion of the signal occurs. Another technical advantage of an embodiment includes adjusting the variable feedback of the PDAC to operate with a variable NDAC.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
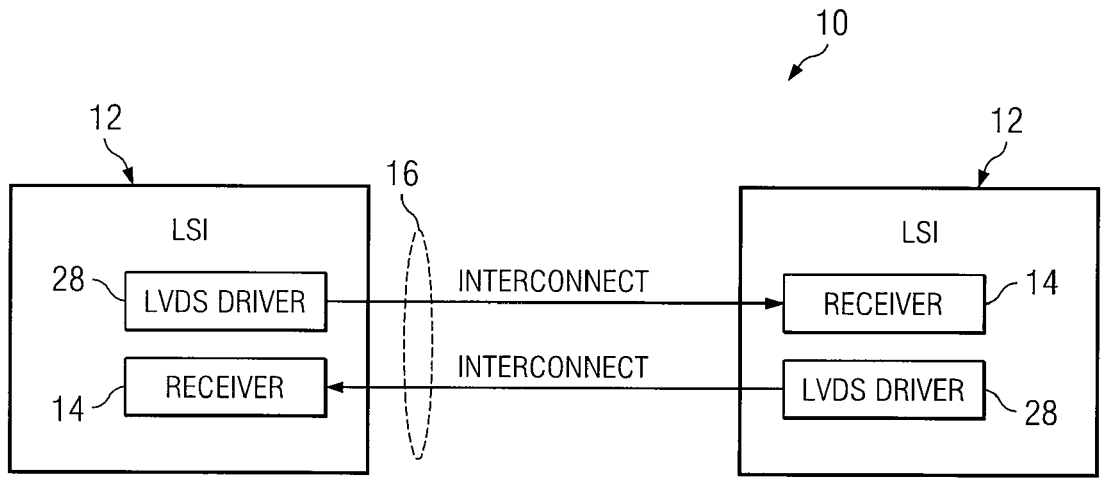
FIG. 1 illustrates one embodiment of a network element for digital transmission between large-scale integration integrated circuits having an LVDS driver for high-speed digital transmission.

FIG. 1 illustrates one embodiment of a network element 10 for digital transmission between large-scale integration (LSI) integrated circuits (ICs) 12 having an LVDS driver 28 for high-speed digital transmission. In the illustrated embodiment, network element 10 includes a plurality of LSI ICs 12. LSI ICs 12 include a receiver 14 and an LVDS driver 28 coupled by an interconnect 16. Receiver 14 receives packets from LVDS driver 28. Receiver 14 may include any suitable receiver. Reference to packets may include a packet, datagram, frame, or other unit of data. LVDS driver 28 drives differential signals for high-speed digital transmission from LSI IC 12. Interconnect 16 facilitates transmission of packets between LVDS driver 28 and receiver 14. Interconnect 16 may include any suitable element, such as a cable or a print circuit board trace.

It should be noted that although LVDS driver 28 is illustrated as being used in LSI IC 12 of network element 10, embodiments of the present invention may be used in any suitable network element in any suitable network or in any other appropriate application requiring digital signal transmission.

Figure 2:
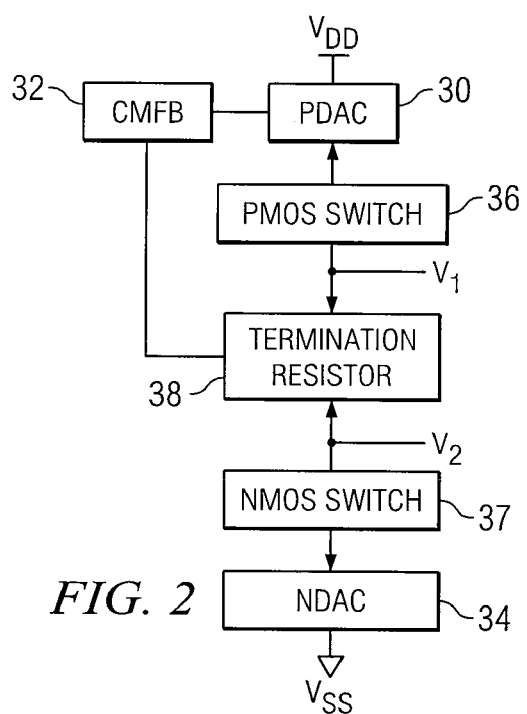
FIG. 2 illustrates a block diagram of the LVDS driver for increasing overall voltage headroom.

FIG. 2 illustrates a block diagram of LVDS driver 28 for improving differential output voltage. Traditional driver architectures provide for the consumption of voltage headroom by components in the driver. The consumption of voltage headroom reduces the amplitude of the output voltage.

In the illustrated embodiment, LVDS driver 28 includes a PDAC 30, a CMFB 32, an NDAC 34, a PMOS switch 36, an NMOS switch 37, and a termination resistor 38. NDAC 34 operates as the current source. NDAC 34 is variable and provides a range of resistance. Traditionally, a common-mode output level is controlled by a CMFB circuit and a fixed-size PMOS. In the illustrated embodiment, a variable feedback PDAC 30 provides for more efficiently operating with the variable NDAC 34 because the resistance of each can be scaled together to maintain a relatively constant ratio of resistance. Therefore, PDAC 30 may vary to operate in the range of NDAC 34. In particular embodiments, LVDS driver 28 improves the differential output voltage and increases the voltage headroom for a signal.

PDAC 30 and NDAC 34 convert digital signals to analog signals. In an embodiment, a plurality of PMOS transistors form PDAC 30 and a plurality of NMOS transistors form NDAC 34. PMOS switch 36 and NMOS switch 37 allow current to flow through PDAC 30 and NDAC 32, respectively. CMFB 32 provides for optimal control of PDAC 30, which stabilizes the common-mode voltage at output nodes using the negative feedback. For example, CMFB 32 controls the common-mode voltage at $V_1$ and $V_2$ and maintains the value of the common-mode voltage at a fraction of the Direct Current (DC) voltage source's ($V_{DD}$) value. For example, the value of the common-mode voltage may equal $V_{DD}/2$. In combination with PDAC 30 and NDAC 34, CMFB 32 provides for maximum differential voltage gain and/or maximum output voltage swing across termination resistor 38, which may be measured as $V_1-V_2$. Using CMFB 32 to apply a common-mode negative feedback suppresses common-mode variations that may distort output signals at nodes $V_1$ and $V_2$.

The configuration of PDAC 30 as a variable resistance provides for improving the overall voltage headroom. For example, the resistance of PDAC 30 and NDAC 34 may be scaled together. Scaling PDAC 30 with NDAC 34 provides for an optimal differential voltage output, which increases the overall voltage headroom. This capability reduces overdrive voltage of selected components in PDAC 30, which increases the overall voltage headroom available. In an embodiment, PDAC 30 and NDAC 34 are linearly related. PDAC 30 and NDAC 34 may be increased and/or reduced to maintain a relatively constant ratio. PDAC 30 and NDAC 34 may be scaled using any suitable technique. For example, controls bits may scale PDAC 30 and NDAC 34 simultaneously. In this example, each control bit may represent a different ratio to implement between PDAC 30 and NDAC 34.

PDAC 30, CMFB 32, NDAC 34, PMOS switch 36, and NMOS switch 37 may include any suitable component that provides for increasing overall voltage headroom. For example, PDAC 30, CMFB 32, and NDAC 34 include a combination of transistors that provide a path for current to flow when a voltage is applied. As another example, LVDS driver 28 includes any suitable transistors, such as PMOS transistors, NMOS transistors, or any suitable combination of the preceding.

Figure 3:
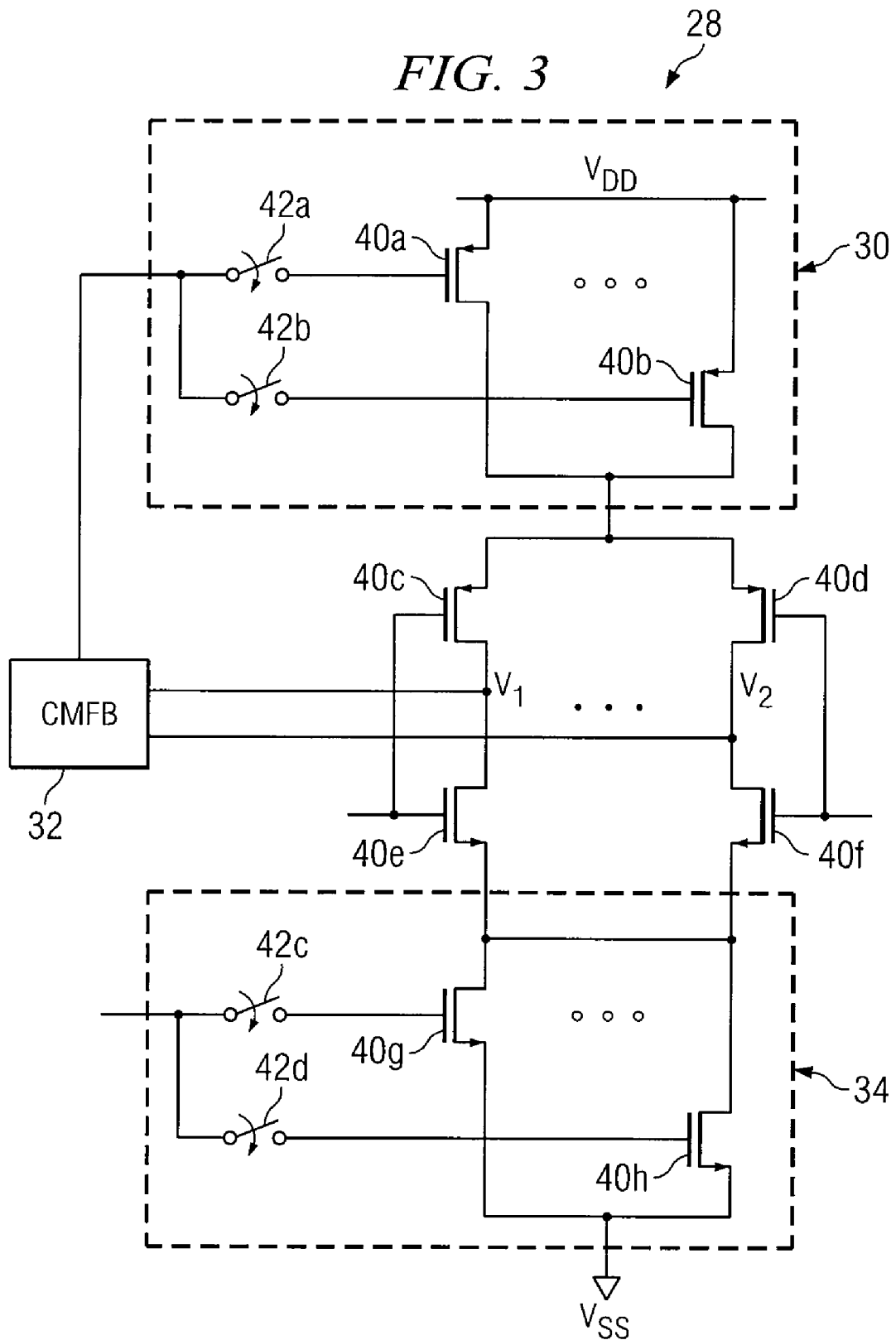
FIG. 3 illustrates an embodiment of a circuit-level diagram of the LVDS driver.

FIG. 3 illustrates an embodiment of a circuit-level diagram of LVDS driver 28. LVDS driver 28 includes a variable PDAC 30 that may be scaled to NDAC 34, which increases the differential output voltage. The higher differential output voltage increases the overall voltage headroom. In the illustrated embodiment, LVDS driver 28 includes a plurality of transistors 40 and a plurality of switches 42. Transistors 40 may be any suitable transistor, including, for example, metal-oxide semiconductor field effect transistors (MOSFETs). Switches 42 may include any suitable configuration of components that prevents current flowing to transistors 40 when in an open position or allows current to flow to transistors 40 when in a closed position. In the illustrated embodiment, switches 42 provide for scaling PDAC 30 with NDAC 34. Each switch 42 may be associated with a set of transistors 40. For example, switch 42 may be associated with a single transistor 40 or multiple transistors 40. For example, switches 42a and 42b associated with transistors 40a and 40b, respectively, and may be formed using PMOS transistors. Switches 42c and 42d associated with transistors 40g and 40h, respectively, and may be formed using NMOS transistors. Additionally, switches 42 allow current to flow through the associated transistor 40. Any suitable combination of switches 42 may be closed and/or opened to provide a relatively constant resistive ratio.

Transistors 40 may be coupled to each other to operate as a current source with an applied voltage. For example, transistors 40a and 40b couple with switches 42a and 42b to form PDAC 30 having a variable resistance. Although FIG. 3 depicts transistors 40a and 40b, any suitable number of transistors 40 is contemplated to form PDAC 30. As another example, transistors 40g and 40h couple with switches 42c and 42d to form NDAC 34 having a variable resistance. Similarly to PDAC 30, any suitable number of transistors 40 is contemplated to form NDAC 34.

The variable resistance provides for variable feedback in LVDS driver 28. Any suitable number of transistors 40 and switches 42 may couple to form PDAC 30 and NDAC 34 having the variable resistance. To vary the resistance, switch 42 associated with transistor 40 is opened to allow current to flow or closed to prevent the current from flowing. Furthermore, any suitable size of transistors 40 may couple to form the desired voltage swing. The size of PDAC 30 and NDAC 34 may depend on the application of use. For example, the size of PDAC 30 and NDAC 34 is proportional to the current. Therefore, if power savings are desired, a small PDAC 30 and/or NDAC 34 are desired. As another example, if a large voltage swing is desired, the resulting selected PMOS size is large.

In an exemplary embodiment of operation, if switch 42a is closed, the current path starts from transistor 40a and flows to transistor 40c. In the illustrated embodiment, transistors 40a, 40b, 40c, and 40d represent PMOS transistors. The current continues through transistor 40f. When switch 42d is closed, the current flow continues through transistor 40h to a DC voltage source ($V_{SS}$). In the illustrated embodiment, transistors 40e, 40f, 40g, and 40h represent NMOS transistors. Switches 42c and 42d also facilitate or prevent current flow in NDAC 34 depending on switch 42 being engaged or disengaged.

In another exemplar embodiment of operation, switch 42b is closed, which allows the current path to start from transistor 40b and continues to transistor 40d. The current flow continues through transistor 40e. If switch 42c is closed, the current path continues through transistor 40g to $V_{SS}$.

Figure 4:
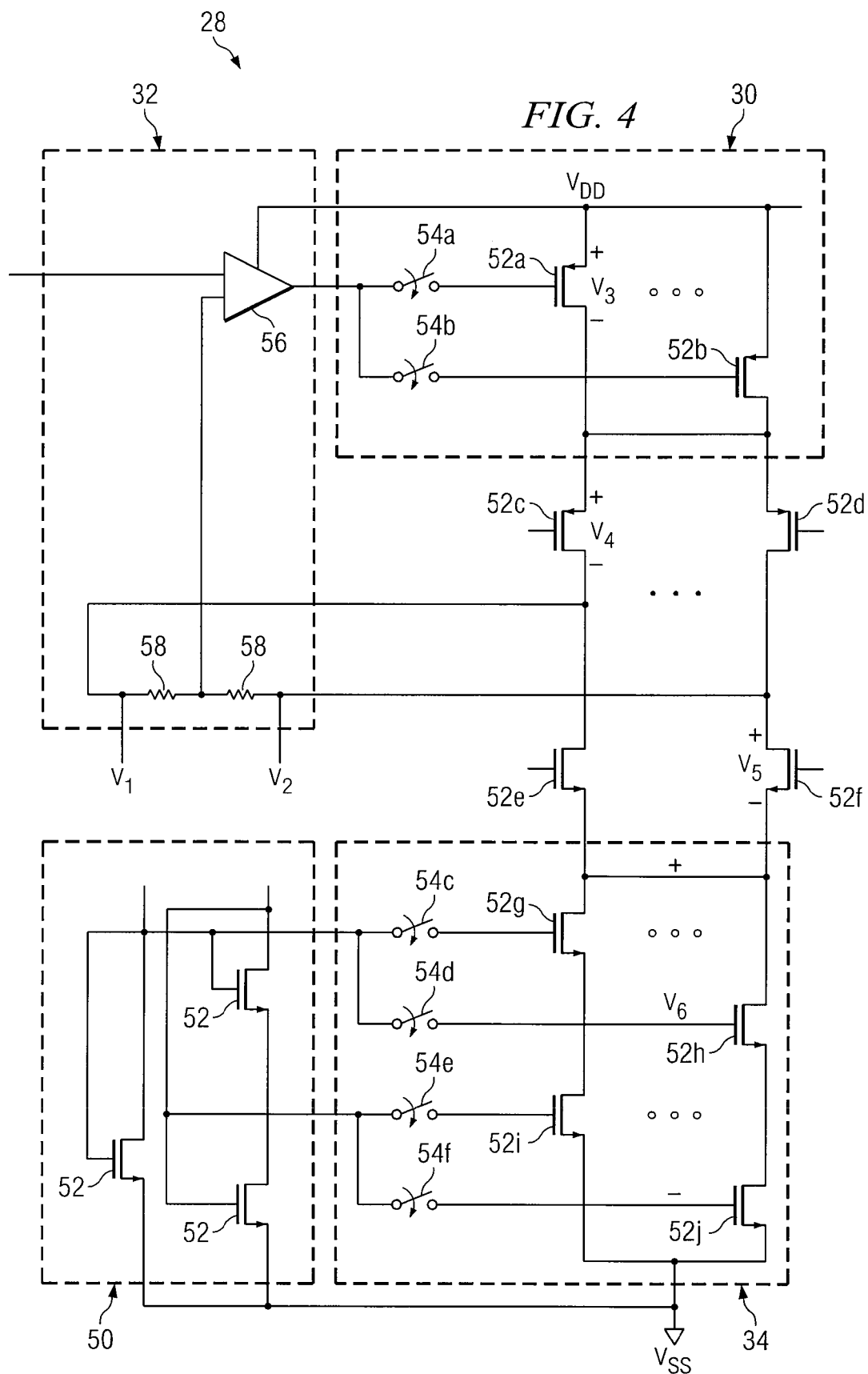
FIG. 4 illustrates another embodiment of a circuit-level diagram of the LVDS driver.

FIG. 4 illustrates another embodiment of a circuit-level diagram of LVDS driver 28. As described above, LVDS driver 28 has a higher differential output voltage, which improves the overall voltage headroom. LVDS driver 28 includes PDAC 30, CMFB 32, NDAC 34, and a current bias 50. PDAC 30 and NDAC 34 include transistors 52 and switches 54 coupled as illustrated in FIG. 4. Any suitable number of transistors 52 and switches 54 may be included in PDAC 30 and NDAC 34 to implement the process of converting analog signals to digital signals, and vice-versa. CMFB 32 includes an amplifier 56 and resistors 58. Amplifier 56 includes any suitable component operable to provide a gain in voltage. Resistors 58 may be any suitable resistance and may be any suitable value. For example, the component value of resistors 58 may be selected to produce a desired voltage drop between PDAC 30 and NDAC 34. Current bias 50 includes any suitable components, for example, transistors 52, that provide a steady flow of current through transistors 52. In the illustrated embodiment, current bias 50 and NDAC 34 couple to form a cascode current mirror, which further improves the differential output voltage.

LVDS driver 28 includes NDAC 34 and output common-mode feedback with PDAC 30 control loop. LVDS driver 28 achieves a differential output voltage swing ($V_1-V_2$) greater than 0.7V when the supply voltage is 1.2V. The differential output voltage slightly decreases when the supply voltage decreases 10% to 1.08V.

In operation, the current path starts from transistor 52a and continues to transistor 52c. Engaging and disengaging switches 54a and 54b provide for controlling the current flow and varying the resistance of PDAC 30. For example, if current flows through transistor 52a, switch 54a is engaged. In the illustrated embodiment, transistors 52a and 52c are PMOS transistors. The current path continues to transistors 52f, 52g, and 52i. Switches 54c, 54d, 54e, and 54f provide for controlling the current flow and varying the resistance of NDAC 34. For example, if current flows through transistors 52g and 52i, switches 54c and 54e, respectively, are engaged. In an embodiment, transistors 52f, 52g, and 52i are NMOS transistors. Transistors 52a, 52g, and 52i are in saturation mode, and transistors 52c and 52f act as input switches operating in a linear region. When all signals settle, the differential output voltage ($V_1-V_2$) equals the difference of $V_{DD}$, the voltage drop across transistor 52a ($V_3$), the voltage drop across transistor 52c ($V_4$), the voltage drop across transistor 52f ($V_5$), and the voltage drop across transistors 52g and 52i ($V_6$). [$V_1-V_2=V_{DD}-V_3-V_4-V_5-V_6$].

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A low-voltage differential signal driver for high-speed digital transmission, comprising:
    a first signal converter operable to receive a signal in a first type and convert the signal into a second type, wherein a resistance of the first signal converter is variable;
    a common-mode feedback circuit coupled to the first signal converter, the common-mode feedback circuit comprising an amplifier that receives an input at a terminal, wherein the input is a differential voltage measured across output nodes of the driver and the common-mode feedback circuit is operable to control the first signal converter by controlling a common-mode voltage;
    a second signal converter coupled to the first signal converter, the second signal converter operable to receive a signal in the second type and convert the signal into the first type, wherein a resistance of the second signal converter is variable;
    a current bias coupled to the second signal converter to form a cascode current mirror;
    wherein the first and second signal converters each comprise a first set of one or more transistors coupled in parallel with a second set of one or more transistors, and a switch associated with each of the first and second sets, the switch operable to allow and prevent current flow through the first and second sets;
    wherein the driver is operable to scale the resistances of the first and second signal converters to provide a constant ratio between the resistances of the first and second signal converters and differential output voltage of the driver increases according to the resistances of the first and second signal converters being scaled by reducing an overdrive voltage of the first signal converter; and
    wherein the cascode current mirror further increases the differential output voltage.

2. The driver of claim 1, wherein:
    the first signal converter comprises a plurality of switches operable to vary the resistance of the first signal converter; and
    the second signal converter comprises a plurality of switches operable to vary the resistance of the second signal converter.

3. The driver of claim 2, wherein the plurality of switches in the first signal converter is operable to scale the resistance of the first signal converter to the resistance of the second signal converter.

4. The driver of claim 1, wherein the first signal converter comprises a plurality of p-channel metal-oxide semiconductor field effect transistors.

5. The driver of claim 1, wherein the second signal converter comprises a plurality of n-channel metal-oxide semiconductor field effect transistors.

6. The driver of claim 1, wherein the first signal converter and the second signal converter are operable to drive signals at an Ethernet switch.

7. A method for driving a low-voltage differential signal driver for high-speed digital transmission, comprising:
    varying a resistance of a first signal converter and a resistance of a second signal converter;
    receiving a signal in a first type at the first signal converter;
    converting the signal into a second type at the first signal converter;
    receiving an input at a terminal of an amplifier included in a common-mode feedback circuit, wherein the input is a differential voltage measured across output nodes of the driver;
    controlling the first signal converter by controlling a common-mode voltage at the common-mode feedback circuit;
    receiving a signal in the second type at the second signal converter;
    converting the signal into the first type at the second signal converter;
    forming a cascode current mirror by coupling a current bias to the second signal converter;
    wherein the first and second signal converters each comprise a first set of one or more transistors coupled in parallel with a second set of one or more transistors, and a switch associated with each of the first and second sets, the switch operable to allow and prevent current flow through the first and second sets;
    wherein varying the resistance of the first signal converter and the resistance of the second signal converter comprises scaling the resistances of the first and second signal converters to provide a constant ratio between the resistances of the first and second signal converters and differential output voltage of the driver increases according to the resistances of the first and second signal converters being scaled by reducing an overdrive voltage of the first signal converter; and
    wherein the cascode current mirror further increases the differential output voltage.

8. The method of claim 7, wherein scaling the resistances of the first and second signal converters comprises providing a constant resistive ratio between the first and second signal converters.

9. The method of claim 7, wherein the signal in the first type is a digital signal, and the signal in the second type is an analog signal.

10. The method of claim 7, further comprising driving signals at an Ethernet switch.

11. A system for driving a low-voltage differential signal driver for high-speed digital transmission, comprising:
    means for varying a resistance of a first signal converter and a resistance of a second signal converter;
    means for receiving a signal in a first type at the first signal converter;
    means for converting the signal into a second type at the first signal converter;
    means for receiving an input at a terminal of an amplifier included in a common-mode feedback circuit, wherein the input is a differential voltage measured across output nodes of the driver;

means for controlling the first signal converter by controlling the common-mode voltage at a common-mode feedback circuit;

means for receiving a signal in the second type at the second signal converter;

means for converting the signal into the first type at the second signal converter;

means for forming a cascode current mirror by coupling a current bias to the second signal converter;

wherein the first and second signal converters each comprise a first set of one or more transistors coupled in parallel with a second set of one or more transistors, and a switch associated with each of the first and second sets, the switch operable to allow and prevent current flow through the first and second sets;

wherein varying the resistance of the first signal converter and the resistance of the second signal converter comprises scaling the resistances of the first and second signal converters to provide a constant ratio between the resistances of the first and second signal converters and differential output voltage of the driver increases according to the resistances of the first and second signal converters being scaled by reducing an overdrive voltage of the first signal converter; and wherein the cascode current mirror further increases the differential output voltage.

12. The system of claim 11, further comprising means for providing a constant resistive ratio between the first and second signal converters.

13. The system of claim 11, wherein the signal in the first type is a digital signal, and the signal in the second type is an analog signal.

14. The system of claim 11, further comprising means for driving signals at an Ethernet switch.

15. The driver of claim 1, wherein the common-mode feedback circuit is further operable to apply common-mode negative feedback to suppress common-mode variations.

* * * * *